(12) United States Patent
Sviri et al.

(10) Patent No.: US 12,580,918 B2
(45) **Date of Patent: *Mar. 17, 2026**

(54) TECHNIQUES FOR PROVIDING LONG UNIFORM RESOURCE LOCATORS THROUGH A SECURE ENVIRONMENT

(71) Applicant: HEWLETT PACKARD ENTERPRISE DEVELOPMENT LP, Spring, TX (US)

(72) Inventors: Guy Sviri, Tel Aviv (IL); Natan Elul, Tel Aviv (IL); Daniel Reisel, Tel Aviv (IL); Shay Shwartz, Tel Aviv (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 763 days.

This patent is subject to a terminal disclaimer.

(21) Appl. No.: 17/647,396

(22) Filed: Jan. 7, 2022

(65) Prior Publication Data

US 2023/0224303 A1 Jul. 13, 2023

(51) Int. Cl.
H04L 29/00 (2006.01)
H04L 9/40 (2022.01)
(Continued)

(52) U.S. Cl.
CPC .......... H04L 63/102 (2013.01); H04L 61/457 (2022.05); H04L 63/168 (2013.01); H04L 67/02 (2013.01)

(58) Field of Classification Search
CPC ..... H04L 63/102; H04L 63/168; H04L 67/02; H04L 61/457
See application file for complete search history.

(56) References Cited

U.S. PATENT DOCUMENTS

| | | | |
|---|---|---|---|
| 7,143,177 B1 * | 11/2006 | Johnson | H04L 65/612 |
| | | | 348/E7.083 |
| 7,412,533 B1 * | 8/2008 | Johnson | H04L 65/65 |
| | | | 348/E7.083 |

(Continued)

FOREIGN PATENT DOCUMENTS

| | | | | |
|---|---|---|---|---|
| CN | 106230788 A | * | 12/2016 | H04L 63/08 |
| CN | 110519656 A | * | 11/2019 | H04N 21/8456 |

(Continued)

OTHER PUBLICATIONS

Rose et al., "Zero Trust Architecture", NIST Special Publication 800-207, Aug. 2020, 59 pages.

*Primary Examiner* — Don G Zhao
(74) *Attorney, Agent, or Firm* — Hewlett Packard Enterprise

(57) ABSTRACT

A method and system for providing web resources having long identifiers through a zero trust network environment. The method comprises receiving a request from a client device to access a web resource through a zero trust network environment, wherein the web resource is external to the zero trust network environment, the request including a first uniform resource locator (URL), and the resource further including a second URL having a first length; fetching the web resource based on the first URL; generating a shortened alternate URL based on at least a portion of the second URL, in response to determining that the first length exceeds a predetermined threshold; generating an alternate resource, the alternate resource including the shortened alternate URL replacing the second URL; and providing the alternate resource to the client device.

19 Claims, 6 Drawing Sheets

(51) Int. Cl.
  H04L 61/45 (2022.01)
  H04L 67/02 (2022.01)

(56) References Cited

U.S. PATENT DOCUMENTS

| | | | | |
|---|---|---|---|---|
| 7,490,169 | B1 * | 2/2009 | Ogdon | H04L 67/02 |
| | | | | 709/248 |
| 8,255,480 | B2 * | 8/2012 | Bedingfield, Sr. | |
| | | | | G06F 16/9566 |
| | | | | 709/217 |
| 8,825,756 | B2 | 9/2014 | Katakawa | |
| 9,058,399 | B2 * | 6/2015 | Piernot | G06F 16/9566 |
| 9,094,443 | B1 * | 7/2015 | Martini | H04L 67/02 |
| 9,594,477 | B1 * | 3/2017 | Ardakani | G06F 16/957 |
| 9,730,255 | B1 * | 8/2017 | Chu | H04L 65/1093 |
| 10,375,060 | B1 * | 8/2019 | Graves | H04W 12/77 |
| 11,201,866 | B1 * | 12/2021 | Specht | H04L 63/1425 |
| 11,223,652 | B1 * | 1/2022 | Pierson | H04L 63/1491 |
| 2002/0133570 | A1 * | 9/2002 | Michel | H04L 61/45 |
| | | | | 709/219 |
| 2003/0100320 | A1 * | 5/2003 | Ranjan | H04L 67/04 |
| | | | | 707/E17.115 |
| 2003/0149581 | A1 * | 8/2003 | Chaudhri | G06Q 30/06 |
| | | | | 705/26.1 |
| 2004/0049579 | A1 * | 3/2004 | Ims | H04L 67/564 |
| | | | | 709/225 |
| 2007/0124414 | A1 * | 5/2007 | Bedingfield | H04L 61/301 |
| | | | | 707/E17.115 |
| 2008/0263134 | A1 * | 10/2008 | Machida | H04L 67/02 |
| | | | | 709/203 |
| 2009/0037806 | A1 * | 2/2009 | Yang | H04L 67/02 |
| | | | | 715/234 |

| | | | | |
|---|---|---|---|---|
| 2011/0191849 | A1 * | 8/2011 | Jayaraman | H04L 63/1416 |
| | | | | 715/205 |
| 2012/0030359 | A1 * | 2/2012 | Piernot | G06F 16/9566 |
| | | | | 709/226 |
| 2014/0259158 | A1 * | 9/2014 | Brown | H04L 51/08 |
| | | | | 726/22 |
| 2015/0039906 | A1 * | 2/2015 | Kolesnik | H04L 63/0435 |
| | | | | 713/190 |
| 2015/0135206 | A1 * | 5/2015 | Reisman | H04H 20/93 |
| | | | | 725/18 |
| 2015/0135214 | A1 * | 5/2015 | Reisman | H04H 60/35 |
| | | | | 725/37 |
| 2015/0156162 | A1 * | 6/2015 | Kaliski, Jr. | H04L 61/4505 |
| | | | | 709/203 |
| 2015/0215381 | A1 * | 7/2015 | Lowell | G06F 40/143 |
| | | | | 709/203 |
| 2015/0370899 | A1 * | 12/2015 | Jung | G06F 16/9566 |
| | | | | 707/722 |
| 2016/0308936 | A1 * | 10/2016 | Yuan | H04L 67/02 |
| 2018/0375745 | A1 * | 12/2018 | Balupari | H04L 43/0876 |
| 2020/0007502 | A1 * | 1/2020 | Everton | H04L 51/063 |
| 2020/0027128 | A1 * | 1/2020 | Strutton | G06Q 30/0267 |
| 2020/0034489 | A1 * | 1/2020 | Liu | H04L 63/0209 |
| 2020/0045351 | A1 * | 2/2020 | Paixao | H04L 65/613 |
| 2020/0266991 | A1 * | 8/2020 | Waters | H04L 9/0891 |
| 2022/0239697 | A1 * | 7/2022 | Jones | H04L 67/02 |
| 2022/0286494 | A1 * | 9/2022 | Zheng | H04L 63/0281 |
| 2023/0224302 | A1 * | 7/2023 | Sviri | H04L 63/168 |
| | | | | 726/5 |

FOREIGN PATENT DOCUMENTS

| | | | | | |
|---|---|---|---|---|---|
| CN | 110602113 | A | * | 12/2019 | G06K 9/6267 |
| CN | 107332856 | B | * | 1/2021 | H04L 63/1416 |
| WO | WO-2012073884 | A1 | * | 6/2012 | G06F 3/01 |

* cited by examiner

```
<html>
<body>

<h1>WEB PAGE</h1>                                                        310
<p>TEXT</p>                                                320

<a href="https://www.example.com/page1?&field1=value1&field2=value2&field3=value3">LINK1</a>   330

<a href="https://www.example.com/page2.html">LINK2</a>    340

<a href="https://www.example.com/page3.html">LINK3</a>    350

</body>
</html>
```

300

TECHNIQUES FOR PROVIDING LONG UNIFORM RESOURCE LOCATORS THROUGH A SECURE ENVIRONMENT

TECHNICAL FIELD

The present disclosure relates generally to providing HTTP web pages through a secure network, and particularly to providing HTTP web pages through a zero trust secure environment.

BACKGROUND

In the past, workers using computer devices would have to come into an office building, where they were assigned a designated computer device, on which they could complete their tasks, be they data entry, writing code, or programming complex microelectronics simulations.

Today however, increasingly employees are finding increased productivity by working anywhere, e.g., on the go in between meetings, at airports, at a location of a client of the employer, whom the employee is currently servicing, and the like. This flexibility is something employees enjoy, while employers benefit.

This work approach is much less secure. While a single office building (location) can be easily managed to direct all communication going in and out, when a first employee wants to access company data from a public hotspot, while another is accessing the same data from within the company, cybersecurity challenges naturally arise.

Add to this the fact that users have a preference to work on their own devices, which means that a company no longer has full IT ownership of the devices. An employee may neglect to update software on their device or may have the device stolen.

One strategic approach to solve some of these security issues is known as implementing a zero trust environment. In a zero trust environment there is no implicit trust of user accounts or devices. The most secure network environment would not allow a user to take any action within the network, but such an environment would be useless as nothing can be gained from having an environment which permits no action. On the other hand, a permissive environment would be fraught with security risks and practically invite attackers to try their hand at gaining an advantage. Therefore, when implementing a zero trust environment, a balance should be sought between security and usability.

For example, a user may wish to use their mobile device, such as a laptop or cellular phone, to connect to a machine on their employer's network. While connected to that machine, the user may want or need to access the internet. It would be a risk to allow the user to have complete internet access, and it would be impractical to bar access altogether.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing web resources having long identifiers through a zero trust network environment. The method comprises: receiving a request from a client device to access a web resource through a zero trust network environment, wherein the web resource is external to the zero trust network environment, the request including a first uniform resource locator (URL), and the resource further including a second URL having a first length; fetching the web resource based on the first URL; generating a shortened alternate URL based on at least a portion of the second URL, in response to determining that the first length exceeds a predetermined threshold; generating an alternate resource, the alternate resource including the shortened alternate URL replacing the second URL; and providing the alternate resource to the client device.

Certain embodiments disclosed herein also include a non-transitory computer readable medium being stored thereon causing a processing circuitry to execute a process, the process comprising: receiving a request from a client device to access a web resource through a zero trust network environment, wherein the web resource is external to the zero trust network environment, the request including a first uniform resource locator (URL), and the resource further including a second URL having a first length; fetching the web resource based on the first URL; generating a shortened alternate URL based on at least a portion of the second URL, in response to determining that the first length exceeds a predetermined threshold; generating an alternate resource, the alternate resource including the shortened alternate URL replacing the second URL; and providing the alternate resource to the client device.

Certain embodiments disclosed herein also include a system for providing web resources having long identifiers through a zero trust network environment. The system comprises: a processing circuitry; and a memory, the memory containing instructions that, when executed by the processing circuitry, configure the system to: receive a request from a client device to access a web resource through a zero trust network environment, wherein the web resource is external to the zero trust network environment, the request including a first uniform resource locator (URL), and the resource further including a second URL having a first length; fetch the web resource based on the first URL; generate a shortened alternate URL based on at least a portion of the second URL, in response to determining that the first length exceeds a predetermined threshold; generate an alternate resource, the alternate resource including the shortened alternate URL replacing the second URL; and provide the alternate resource to the client device.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
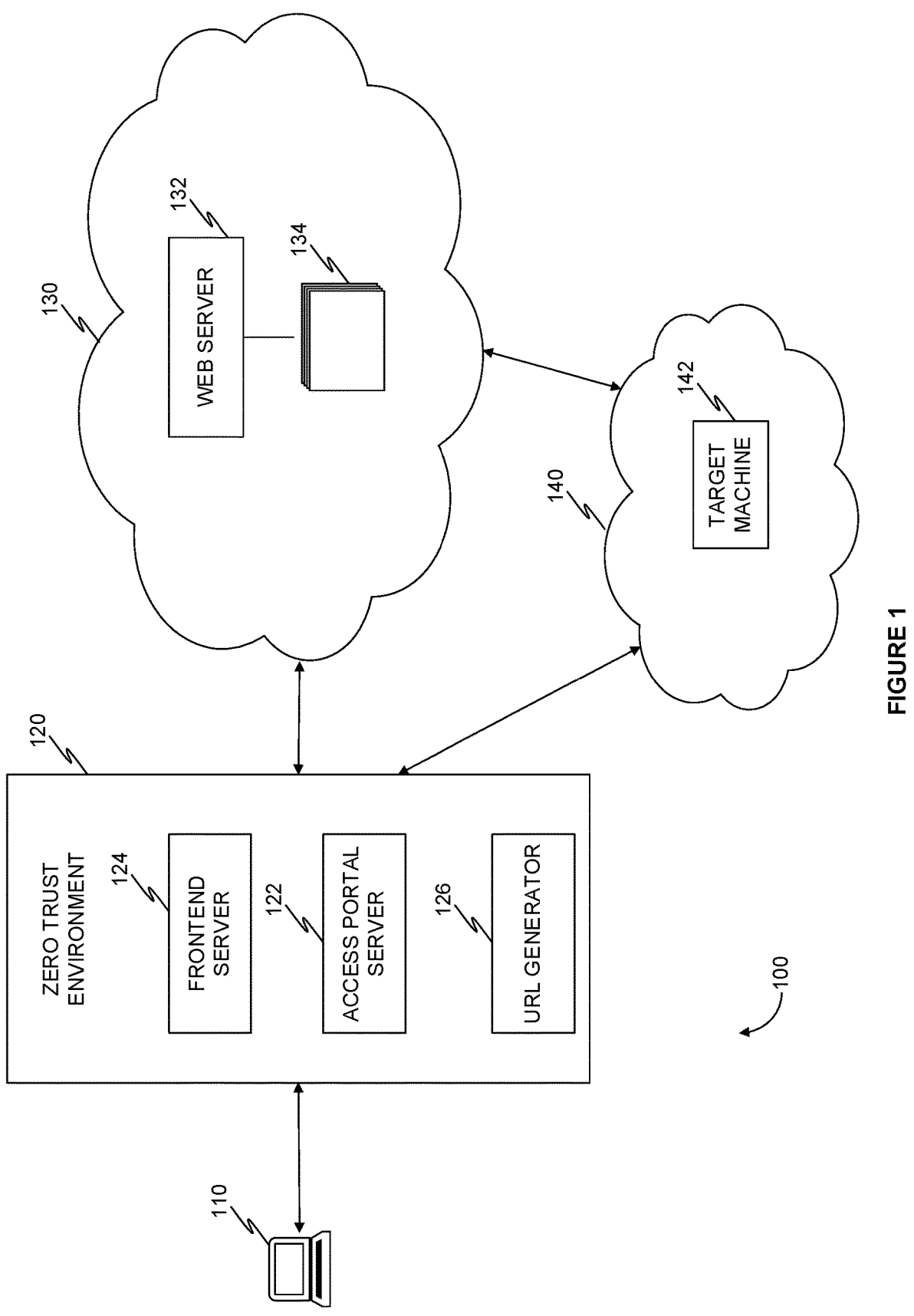
FIG. 1 is a network diagram in which a zero trust environment is utilized to provide a secure connection which allows access to web resources in a secure manner, implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A zero trust network environment is a secure compute environment in which a user device can access when providing access credentials. The zero trust environment may be accessed from a client device through a web browser application. Once authorized, the client device may request web resources using uniform resource locators (URLs). A web resource may be an HTML page. The web resource may include a second URL therein. A frontend server of the zero trust environment may fetch the web resource based on a first URL, and then generate an alternate resource. The alternate resource includes an alternate URL which is generated to replace the second URL. In some embodiments the alternate URL may have a length which exceeds a predetermined threshold. A shortened alternate URL is therefore generated which may be direct to a host associated with the zero trust environment, thus keeping the browsing session within the zero trust environment.

FIG. 1 is an example of a network diagram 100 in which a zero trust environment is utilized to provide a secure connection which allows to access web resources in a secure manner, implemented in accordance with an embodiment.

A client device 110 connects to a zero trust environment 120. The client device 110 may be for example a mobile phone, a laptop computer, personal computer, tablet, and the like. The zero trust environment is a networked computing environment, and may be implemented for example in a cloud computing environment. For example, the zero trust environment 120 may be implemented as a virtual private cloud (VPC) in an Amazon® Web Service (AWS) environment. The zero trust environment 120 includes therein a frontend server 124, an access portal server 122, and a URL (uniform resource locator) generator 126, each of which may be implemented as one or more workloads in the zero trust environment 120. A workload may be, for example, a serverless function, a container cluster, or a virtual machine. For example, the access portal server 122 may be implemented as a virtual machine utilizing Oracle® Virtual-Box™. The frontend server 124 may be implemented as an application on a node in a Kubernetes™ cluster. In an embodiment, a plurality of frontend servers may be implemented. A URL generator 126 may be implemented as a Lambda™ serverless function in AWS.

In an embodiment, the client device 110 connects to the zero trust environment 120 over a network (not shown). The network may be, but is not limited to, a wireless, cellular or wired network, a local area network (LAN), a wide area network (WAN), a metro area network (MAN), the Internet, the worldwide web (WWW), similar networks, and any combination thereof. Connecting to the zero trust environment 120 may include establishing a connection with the access portal server 122, the frontend server 124, and any combination thereof.

For example, a client device 110 may send a request to connect to the access portal server 122. The access portal server 122 may send the client device 110 instructions for rendering an interface, through which the client device 110 sends the access portal server 122 login credentials. Login credentials may be, for example, a username, password, secret, token, certificate, and any combination thereof. In an embodiment the access portal server 122 may utilize an identity and access management (IAM) service (not shown) in order to authenticate a user account, user device, or combination of both.

In response to successfully authenticating the client device 110, the client device 110 is permitted to connect with the frontend server 124. The frontend server 124 may be implemented as a proxy server. In an embodiment, the frontend server 124 may establish a connection with a secure network environment 140. The secure network environment 140 may also be implemented on a cloud computing infrastructure, for example as a VPC on Google® Cloud Platform (GCP). The secure network environment 140 may include a plurality of machines, such as a target machine 142. The target machine 142 may be implemented as a virtual machine, a node in a container cluster, and the like.

In an embodiment, the frontend server 124 may connect with a backend server (not shown), which in turn connects to a connector (not shown), implemented in the secure network environment. The connector may provide communication between workloads (machines) implemented in the secure network environment 140 and a backend server, the backend server implemented in the zero trust environment 120.

The client device 110 may initiate a request to receive a resource from a public network environment 130, such as the Internet. For example, the client device 110 may initiate a request to receive a plurality of web pages 134 from a web server 132, by sending a request over hypertext transfer protocol (HTTP). A resource may be a web page, image, multimedia file, text file, script, and the like.

In an embodiment, the client device 110 may connect with the target machine 142, for example utilizing Secure Shell (SSH) or Remote Desktop Protocol (RDP). The client device 110 may then initiate a request on behalf of the target machine 142, which causes the target machine 142 to access the web server 132. Alternatively, the client device 110 may attempt to request a resource from the web server 132 on behalf of itself (and not the target machine 142). In either embodiment, there may be a security concern with allowing the client device 110 to make such a request.

For example, spyware, adware and other types of malware may infect the client device 110 or the target machine 142 (in an embodiment where the client device 110 at least partially controls or accesses the target machine 142) if allowed unfettered access to public networks. In some embodiments, a policy may be enforced to allow or block certain types of network traffic, for example based on geolocation, IP address, domain name, and the like. The policy may be generated and stored in a policy engine (not shown) in the zero trust environment 120.

When receiving a URL request, the frontend server 124 may fetch the resource, and provide the resource to the URL generator 126. The URL generator 126 may receive a resource, scan the resource for additional URLs, replace at least a portion of the URLs with alternate URLs, and generate an alternate resource, which is sent to the client device in place of the original resource. Thus, the user of the client device 110 is able to experience web browsing, while potentially malicious or unapproved resources may be blocked. Rewriting the URLs allows to replace external URLs (not associated with the zero trust environment 120) with internal URLs, which are associated with the zero trust environment 120, thereby remaining within the secure browsing session established between the client device 110 and the zero trust environment 120. It may further decrease the security risk posed by external resources.

However, in some instances, a URL may exceed a size limit enforced for example by a web browser. For example, Microsoft® Internet Explorer does not support URLs which are longer than 2,048 characters. However, as further illustrated in FIG. 2 below, a URL length may exceed this number. This is allowable according to the hypertext transfer protocol (HTTP), as there is no limit to a URL length. In such embodiments where the rewritten URL is too long (which may be determined by the URL generator 126, for example according to a predetermined length threshold) the URL generator 126 may generate an alternate shortened URL. The alternate shortened URL may be stored in a table together with the alternate URL and the original URL, so that the URL generator 126 can translate the alternate shortened URL to either the alternate URL or the original URL.

Figure 2:
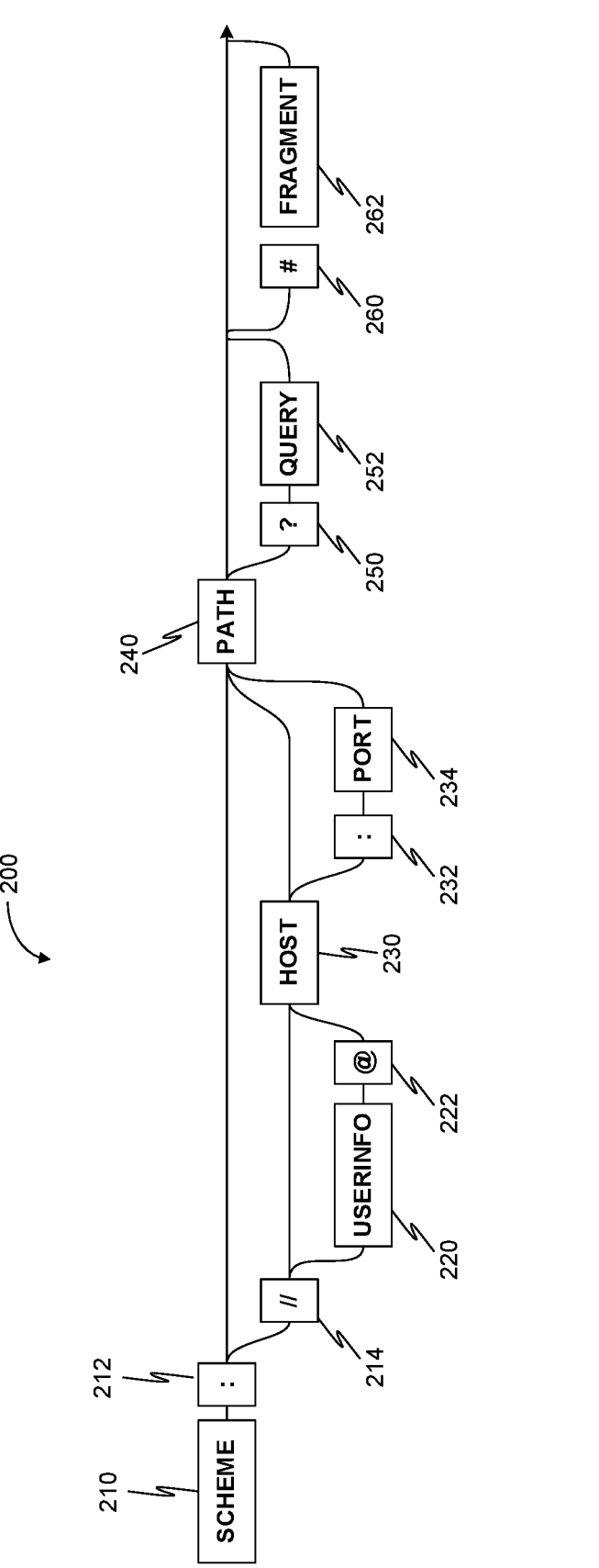
FIG. 2 is a uniform resource locator scheme, implemented in accordance with an embodiment.

FIG. 2 is an example of a uniform resource locator scheme, implemented in accordance with an embodiment. A URL 200 includes a scheme 210, followed by a colon 212. The scheme 210 may be, for example, HTTP, HTTP secure (HTTPS), file transfer protocol (FTP), and the like. The colon 212 may be followed by a double slash 214. A username may then be specified as userinfo 220, which identifies a username. In some embodiments, the userinfo 220 may further include a password or hashed password, separated by a colon from the username. However, such practice is generally discouraged as the password would be at least somewhat exposed. The userinfo is followed by an at symbol @ 222, which indicates that the userinfo 220 is of a host 230. A host 230 may be indicated by a domain name, such as www.example.com. The host 230 may be followed by a colon 232 to indicate a port 234 through which the host 230 should be accessed. Typically, in HTTP port 80 is assumed for open traffic. A path 240 may include a sequence of path segments, separated by a forward slash, such as www.example.com/path1/path2/ in which path1 and path2 are each segments of a path 240.

The path 240 may be optionally followed by a question mark 250, after which a query string is displayed. A query may include a plurality of components, which may be separated by a delimiter, such as an ampersand or semicolon. Optionally, the path 240 may be followed by a hash 260 and fragment identifier 262, which directs the browser to display a web page beginning at the fragment identifier. A majority of the components described above can further be composed of non-Latin alphabet characters. In order to be able to transfer such alphabets webpages and URLs are encoded using UTF-8 (universal transformation format-8 bit) with characters which are not natively supported by URLs being converted to hexadecimal using percent encoding, so a single character may be represented, for example as % E5, thus making the total length of the URL longer.

Figure 3:
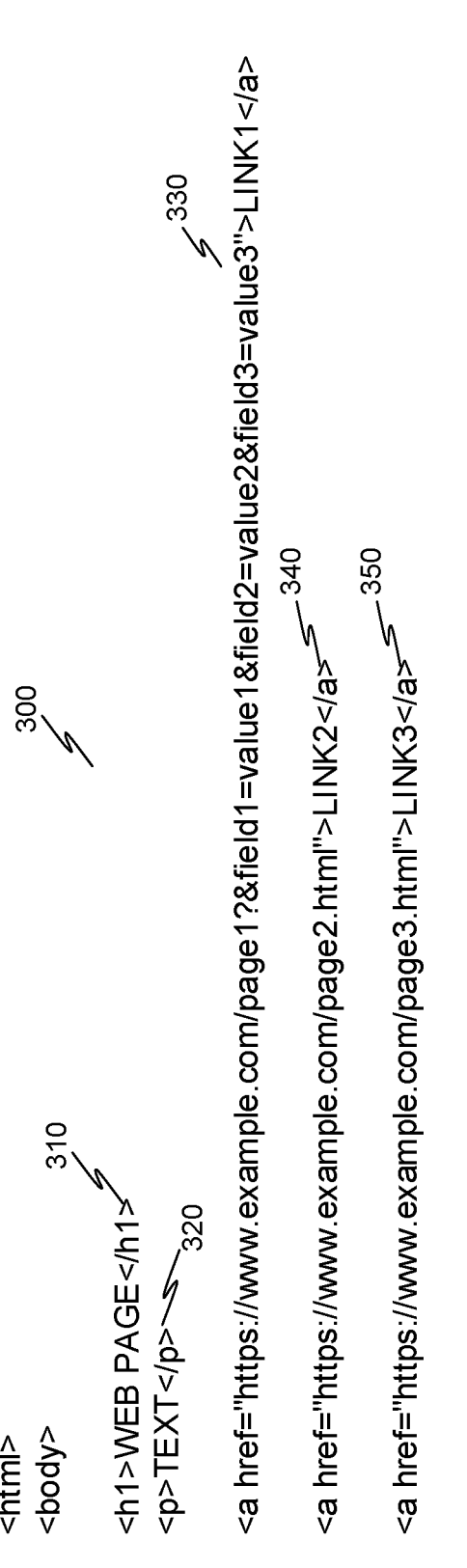
FIG. 3 is a code representation of a web page, implemented in accordance with an embodiment.

FIG. 3 is an example of a code representation 300 of a web page, implemented in accordance with an embodiment. A web page 300 may be represented as HTML (hypertext markup language) script, which when received by a web browser configures the web browser to render the web page according to the script. For example, a header is represented by code line 310. In HTML script, text placed between a <h1> and a </h1> marker will be rendered by a web browser as a header. The web browser may have predefined rules for how a header should be rendered, including font type, font size, font attributes (such as bold, italics, underline, etc.), color and the like. A first link is represented by code line 330. In this embodiment, the link in code line 330 is for a domain "www.example.com". A URL generator, such as URL generator 126 of FIG. 1 above may be defined, for example by a predetermined policy to translate the "www.example.com" domain, which is not associated with a zero trust network environment, to an alternate URL from "examplecom.securenetwork.com", where securenetwork.com is a domain associated with a zero trust network environment. When a user clicks on the hyperlink which represents code line 330, rather than fetching a resource from example.com, the web browser is directed to fetch a resource from examplecom-.securenetwork.com, which is an alternate URL directed to the zero trust network. Thus, the browsing session of the client device passes through the zero trust network, and may retain all the benefits thereof.

However, if the alternate URL is too long, a shortened alternate URL may be generated. For example, the URL of code line 330 is:

https://www.example.com/
page1?&field1=value1&field2=value2&field3=value3
This URL may be translated to an alternate URL using the examplecom.securenetwork.com domain:

https://examplecom.securenetwork.com/
page1?&field1=value1&field2=value2&field3=value3
which may be too long. Therefore the URL generator may generate an alternate shortened URL:

https://examplecom.securenetwork.com/@shortURL1
in order to indicate a shortened URL. The alternate shortened URL may be stored together with the alternate URL and original URL, as each of them contain data fields which may be required in order to fetch the correct resource which is requested by the user device.

In an embodiment, the URL generator may store a translation table, or alternatively use a translation policy to translate the alternate URL (or shortened alternate URL) to an original URL. The frontend server 124 may then fetch a resource from the original URL, and present it to the client device 110. This method is described in more detail in FIG. 5 below.

While in real world applications the URL in this example would not be considered long, it is nonetheless given as a practical example, since a long URL (e.g. a URL having over 2,048 characters) would be cumbersome to present in this disclosure.

Figure 4:
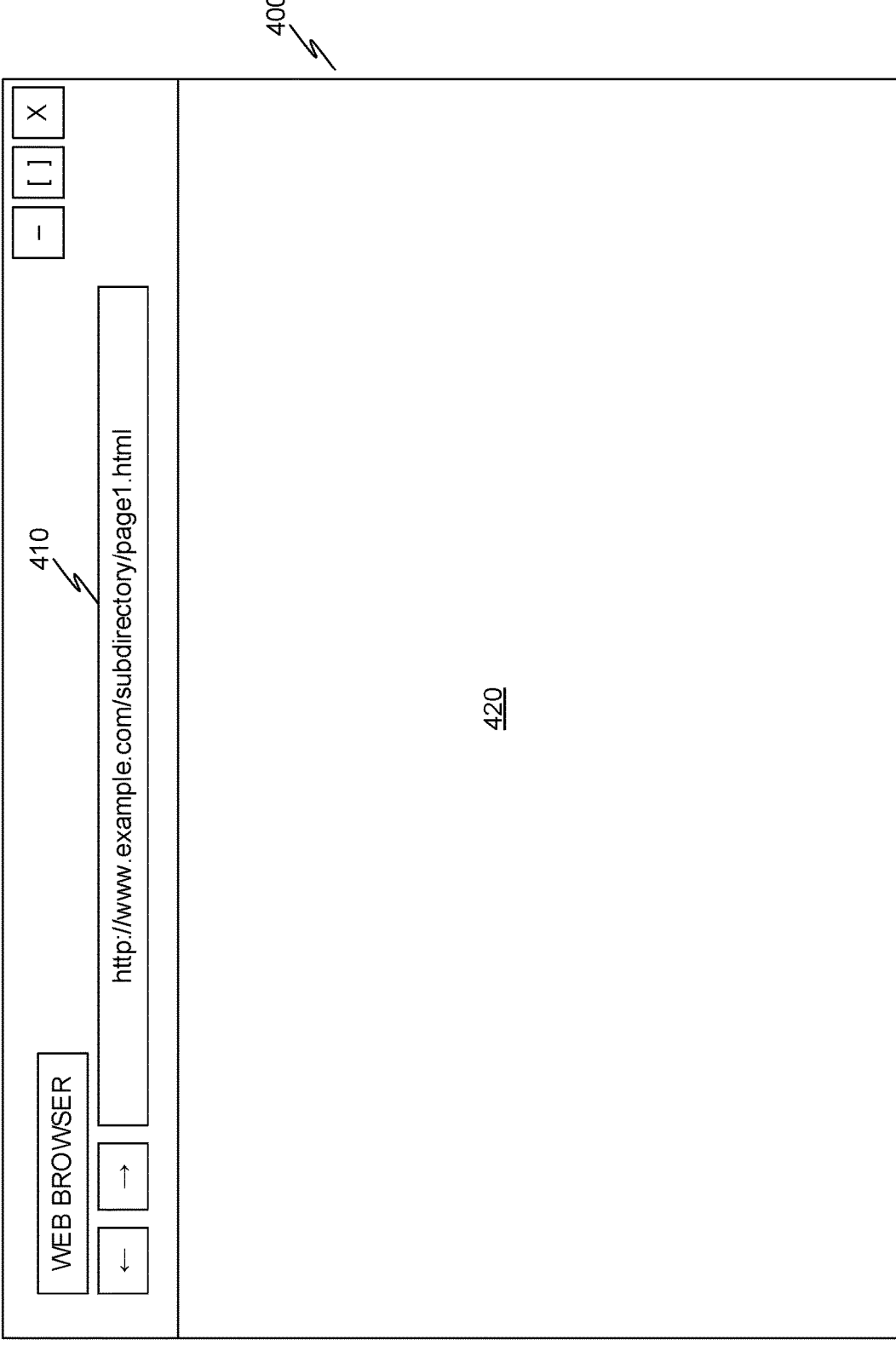
FIG. 4 is a schematic illustration of a web browser implemented in accordance with an embodiment.

FIG. 4 is an example of a schematic illustration of a web browser 400 implemented in accordance with an embodiment. A web browser 400 may be implemented as an application on a client device, such as client device 110 of FIG. 1 above. A web browser 400 may include an address bar 410, and a viewer 420. The address bar 410 displays the current URL which is shown in the viewer 420, and is further used as an input into which a user may provide a text string which directs the browser to fetch another resource based on the provided input, which is typically a URL. The resource may be displayed in the viewer 420. While the HTTP protocol does not in itself limit the length of URLs, browsers often do. Another factor to consider is that URLs may be provided as input from human users, and having long URLs is impractical as it would require a human operator to provide a lengthy input in order to direct the web browser 400 to the appropriate resource. Therefore, from a user experience point of view, shortening URLs is beneficial when seen as inputs. However, long URLs provide the opportunity to transfer an abundance of data, which may allow to pinpoint a specific portion of a specific resource at a specific time, which is also beneficial to the user. Therefore, preserving long URLs and the data included therein is of value.

Figure 5:
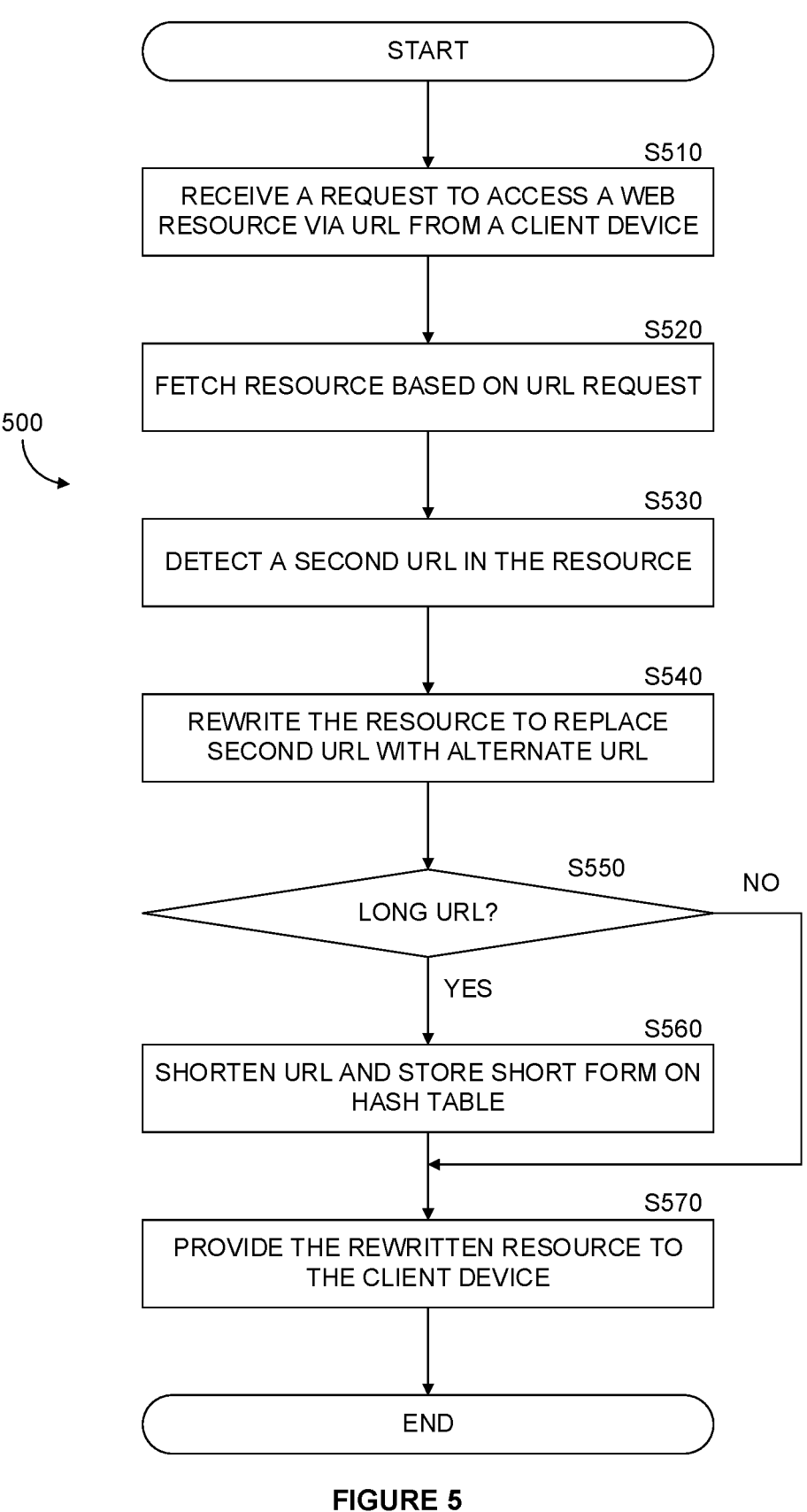
FIG. 5 is a flowchart of a method for rewriting long URLs delivered through a zero trust environment, implemented in accordance with an embodiment.

FIG. 5 is an example of a flowchart 500 of a method for rewriting long URLs delivered through a zero trust environment, implemented in accordance with an embodiment.

At S510, a request is received to access a web resource. The request may originate from a client device (also known as a user device). The client device may be, but is not limited to, a personal computer, a laptop, a tablet computer, a smartphone, a wearable computing device, or any other device capable of receiving and displaying web resources. The request may include a resource locator, such as a URL, which indicates a network address (e.g., host and path) and a resource (e.g., file identifier) which should be fetched from the network address.

At S520, the web resource is fetched, based on the URL request. In an embodiment, a URL generator may determine if the URL is of a host associated with a zero trust network environment (internal URL), or if it is associated with a host not associated with the zero trust network environment (i.e. external URL). If the URL is an internal URL, the URL generator may translate the URL to an external URL (i.e. the original URL). In the example discussed in FIG. 4 above, if the client device requests a resource from a URL designated as examplecom.securenetwork.com, the URL generator can detect that this is an internal URL, and translate this URL to the external URL by substituting the domain to example-.com. The frontend server may then fetch the resource from the external URL.

At S530, a second URL is detected in the resource. In an embodiment the second URL is not associated with a host of the zero trust network environment. In certain embodiments, a plurality of second URLs may be detected. The second URL may be detected by a URL generator, which is configured, for example, to scan HTML scripts for tags indicating a URL (a href tag).

At S540, an alternate resource is generated by rewriting the fetched resource with an alternate URL, which replaces the second URL. The alternate URL includes a host which is associated with the zero trust network environment. In an embodiment where a plurality of second URLs are detected, an alternate URL may be generated for each, for example by a URL generator. In an embodiment, a translation table may be used to store pairs of original and alternate URLs. In certain embodiments, the URL translator may utilize policies, including heuristics, to determine how to generate an alternate URL. Thus, an alternate URL can be converted back to an original URL by using the same (or complementary) policy or heuristic used to convert the original URL to the alternate URL.

At S550, a check is performed to determine if the alternate URL is a long URL. A long URL is a URL whose length (i.e., number of characters) exceeds a predetermined threshold. In an embodiment, the predetermined threshold may be determined by the type of browser used by the client device. If the URL is determined to be a long URL execution continues at S560, otherwise execution continues at S570.

At S560, a shortened alternate URL is generated. The shortened alternate URL may be based on the alternate URL, or the original URL. In an embodiment, a hash function may be used such that the input of the hash function is at least a portion of the alternate (or original) URL, and the output is a fixed length string. The at least a portion of the alternate URL may be, for example, all characters included in the path, and thereafter. The output may be a string of characters, encoded for HTML, and the shortened alternate URL include a host identifier (such as example.com) followed by a forward slash and the output of the hash function. In another embodiment, a random (or substantially random) string may be assigned to the shortened URL portion, which is stored together in a table of a URL generator, to allow lookup and translate the shortened form back to the original URL.

At S570, the alternate resource is provided. The alternate resource may be provided to the client device which requested the original resource. An alternate resource may be an HTML script which was scanned for external URLs, each of which was replaced with an alternate URL (or shortened alternate URL) which directs to an internal URL, wherein the internal URLs are directed to the zero trust network environment.

In an embodiment another check may be optionally performed to determine if another resource is requested. For example, a client device may request a plurality of resources, such as any of: a web page, an image, text file, multimedia file, and the like. If another resource is requested execution may continue a S520, otherwise execution may terminate.

Figure 6:
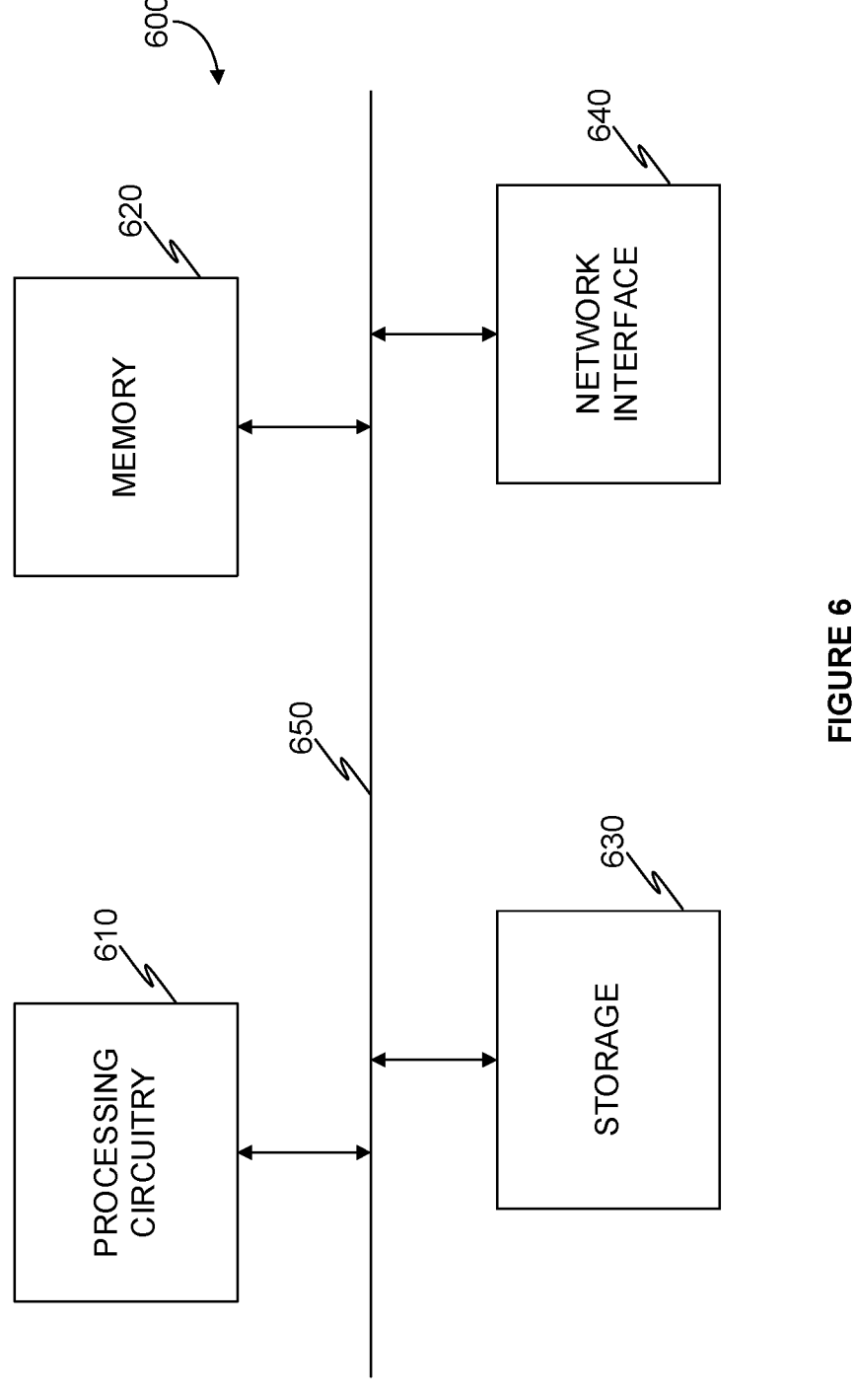
FIG. 6 is a schematic diagram of a URL generator 600 implemented according to an embodiment.

FIG. 6 is an example of a schematic diagram of a URL generator 600 implemented according to an embodiment. The URL generator 600 includes a processing circuitry 610 coupled to a memory 620, a storage 630, and a network interface 640. In an embodiment, the components of the URL generator 600 may be communicatively connected via a bus 650. In certain embodiments, a frontend server 124 and URL generator 126 may be implemented as a single machine, i.e., URL generator 600.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, or any other medium which can be used to store the desired information.

The network interface 640 allows the URL generator 600 to communicate with, for example, a frontend server 124 of FIG. 1.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method comprising:
receiving a request from a web browser in a client device to access a web resource through a zero trust network environment, wherein the web resource is external to the zero trust network environment, the request includes a first uniform resource locator (URL), and the web resource includes a second URL having a first domain name of a domain outside the zero trust network environment;
fetching the web resource based on the first URL;
translating, by a system comprising a hardware processor, the second URL in the web resource to an alternate URL having a second domain name of a domain in the zero trust network environment, wherein the alternate URL has a first length;
determining, by the system, a type of the web browser, and a URL length threshold representing a URL length supported by the type of the web browser;
determining, by the system, whether the first length of the alternate URL exceeds the URL length threshold;
based on determining that the first length of the alternate URL exceeds the URL length threshold, generating, by the system, a shortened alternate URL based on at least a portion of the alternate URL, the shortened alternate URL comprising the second domain name followed by a hash value produced by a hash function applied on the at least a portion of the alternate URL;
generating, by the system, an alternate resource in which the shortened alternate URL is included as a replacement for the second URL, and
providing, by the system, the alternate resource to the client device.

2. The method of claim 1, wherein the at least a portion of the alternate URL on which the hash function is applied comprises a path of the alternate URL.

3. The method of claim 1, wherein the web resource comprises a hypertext markup language (HTML) document.

4. The method of claim 1, further comprising:
storing the shortened alternate URL with the second URL in a translation table.

5. The method of claim 4, further comprising:
receiving a further request from the client device to access a further web resource, the further request including the shortened alternate URL;
translating, by the system using the translation table, the shortened alternate URL included in the further request to the second URL; and
generating an instruction to fetch the further web resource using the second URL translated from the shortened alternate URL by the system.

6. The method of claim 5, further comprising:
fetching, by the system, the further web resource using the second URL; and
providing, by the system, the further web resource to the client device.

7. The method of claim 5, further comprising:
generating, by the system, a second alternate resource, the second alternate resource including a second alternate URL replacing a third URL in the further web resource; and

providing, by the system, the second alternate resource to the client device.

8. The method of claim 1, wherein the zero trust network environment comprises a cloud computing environment to which a user provides login credentials to access a resource in the zero trust network environment.

9. A non-transitory computer readable medium comprising instructions that upon execution cause a system to:
receive a request from a web browser in a client device to access a web resource through a zero trust network environment, wherein the web resource is external to the zero trust network environment, the request includes a first uniform resource locator (URL), and the web resource includes a second URL having a first domain name of a domain outside the zero trust network environment;
fetch the web resource based on the first URL;
translate the second URL in the web resource to an alternate URL having a second domain name of a domain in the zero trust network environment, wherein the alternate URL has a first length;
determine a type of the web browser, and a URL length threshold representing a URL length supported by the type of the web browser;
determine whether the first length of the alternate URL exceeds the URL length threshold;
based on determining that the first length of the alternate URL exceeds the URL length threshold, generate a shortened alternate URL based on at least a portion of the alternate URL, the shortened alternate URL comprising the second domain name followed by a hash value produced by a hash function applied on the at least a portion of the alternate URL;
generate an alternate resource in which the shortened alternate URL is included as a replacement for the second URL; and
provide the alternate resource from the system to the client device.

10. The non-transitory computer readable medium of claim 9, wherein the at least a portion of the alternate URL on which the hash function is applied comprises a path of the alternate URL.

11. The non-transitory computer readable medium of claim 9, wherein the instructions upon execution cause the system to further:
store the shortened alternate URL with the second URL in a translation table.

12. The non-transitory computer readable medium of claim 11, wherein the instructions upon execution cause the system to further:
receive a further request from the client device to access a further web resource using the alternate URL;
translate, using the translation table, the shortened alternate URL included in the further request to the second URL; and
generate an instruction to fetch the further web resource using the second URL translated from the shortened alternate URL by the system.

13. The non-transitory computer readable medium of claim 12, wherein the instructions upon execution cause the system to further:
fetch the further web resource using the second URL; and
provide the further web resource from the system to the client device.

12

14. A system comprising:
a processor; and
a non-transitory storage medium storing instructions executable on the processor to:
receive a request from a web browser in a client device to access a web resource through a zero trust network environment, wherein the web resource is external to the zero trust network environment, the request includes a first uniform resource locator (URL), and the web resource includes a second URL having a first domain name of a domain outside the zero trust network environment;
fetch the web resource based on the first URL;
translate the second URL in the web resource to an alternate URL having a second domain name of a domain in the zero trust network environment, wherein the alternate URL has a first length;
determine a type of the web browser, and a URL length threshold representing a URL length supported by the type of the web browser,
determine whether the first length of the alternate URL exceeds the URL length threshold;
based on determining that the first length of the alternate URL exceeds the URL length threshold, generate a shortened alternate URL based on at least a portion of the alternate URL, the shortened alternate URL comprising the second domain name followed by a hash value produced by a hash function applied on the at least a portion of the alternate URL;
generate an alternate resource in which the shortened alternate URL is included as a replacement for the second URL; and
provide the alternate resource from the system to the client device.

15. The system of claim 14, wherein the at least a portion of the alternate URL on which the hash function is applied comprises a path of the alternate URL.

16. The system of claim 14, wherein the instructions are executable on the processor to:
store the shortened alternate URL with the second URL in a translation table;
receive a further request from the client device to access a further web resource using the shortened alternate URL;
translate, using the translation table, the shortened alternate URL included in the further request to the second URL; and
generate an instruction to fetch the further web resource using the second URL translated from the shortened alternate URL by the system.

17. The system of claim 16, wherein the instructions are executable on the processor to:
fetch the further web resource using the second URL; and
provide the further web resource from the system to the client device.

18. The system of claim 14, wherein the web resource comprises a hypertext markup language (HTML) document.

19. The system of claim 14, wherein the zero trust network environment comprises a cloud computing environment to which a user provides login credentials to access a resource in the zero trust network environment.

* * * * *